United States Patent
Stefanidis et al.

(10) Patent No.: US 10,187,665 B2
(45) Date of Patent: Jan. 22, 2019

(54) SYSTEM AND METHOD FOR CREATING AND INSERTING EVENT TAGS INTO MEDIA CONTENT

(71) Applicant: Disney Enterprises, Inc., Burbank, CA (US)

(72) Inventors: Efthimis Stefanidis, Douglaston, NY (US); Michael Strein, New York, NY (US); David Stankoski, Brooklyn, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/691,161

(22) Filed: Apr. 20, 2015

(65) Prior Publication Data

US 2016/0309204 A1    Oct. 20, 2016

(51) Int. Cl.
   *H04N 21/2187*    (2011.01)
   *H04N 21/234*     (2011.01)
   *H04N 21/262*     (2011.01)
   *H04N 21/845*     (2011.01)
   *H04N 21/854*     (2011.01)

(52) U.S. Cl.
   CPC ... *H04N 21/2187* (2013.01); *H04N 21/23418* (2013.01); *H04N 21/2625* (2013.01); *H04N 21/8455* (2013.01); *H04N 21/854* (2013.01)

(58) Field of Classification Search
   CPC .......................... H04N 21/235; H04N 21/234
   See application file for complete search history.

(56) References Cited

U.S. PATENT DOCUMENTS

| | | | |
|---|---|---|---|
| 6,675,384 B1 * | 1/2004 | Block | H04N 21/4542 348/E5.096 |
| 7,802,279 B1 * | 9/2010 | Vantalon | H04N 21/4345 725/100 |
| 9,270,515 B1 * | 2/2016 | Postelnicu | H04N 21/23424 |
| 2002/0033842 A1 * | 3/2002 | Zetts | H04N 21/236 715/719 |
| 2002/0092019 A1 * | 7/2002 | Marcus | H04N 21/25866 725/37 |
| 2002/0164149 A1 * | 11/2002 | Wilkinson | H04N 21/235 386/336 |
| 2003/0192044 A1 * | 10/2003 | Huntsman | H04N 21/44029 725/25 |
| 2005/0064858 A1 * | 3/2005 | Makela | H04M 3/567 455/419 |
| 2006/0053471 A1 * | 3/2006 | Walker | H04N 21/4408 725/135 |
| 2007/0239787 A1 * | 10/2007 | Cunningham | G06F 3/04817 |
| 2007/0250863 A1 * | 10/2007 | Ferguson | H04N 21/25883 725/46 |
| 2007/0265979 A1 * | 11/2007 | Hangartner | H04N 21/4755 705/59 |

(Continued)

*Primary Examiner* — Randy A Flynn
(74) *Attorney, Agent, or Firm* — Farjami & Farjami LLP

(57) ABSTRACT

There is provided an event tag insertion system. The system includes a memory and a processor configured to receive a media content, receive an input from an event indicator device, the input corresponding to an event in the media content, generate an event tag, the event tag including the input from the event indicator device and a position of the event in the media content, and insert the event tag as metadata into the media content.

14 Claims, 2 Drawing Sheets

(56) References Cited

U.S. PATENT DOCUMENTS

| | | | |
|---|---|---|---|
| 2008/0201747 A1* | 8/2008 | Cooper | H04N 21/2396 725/93 |
| 2008/0215620 A1* | 9/2008 | Folgner | G06Q 10/10 |
| 2009/0144785 A1* | 6/2009 | Walker | H04N 21/2187 725/105 |
| 2011/0191320 A1* | 8/2011 | Glover | G06F 17/30 707/706 |
| 2012/0237185 A1* | 9/2012 | Satoh | H04N 21/23424 386/278 |
| 2013/0151251 A1* | 6/2013 | Herz | H04N 21/4398 704/235 |

* cited by examiner

SYSTEM AND METHOD FOR CREATING AND INSERTING EVENT TAGS INTO MEDIA CONTENT

BACKGROUND

Television and radio broadcasters provide many live programming events, such as concerts, sports events and speeches. Such live programming events include a slight delay to permit real-time editing of a live broadcast to eliminate the transmission of offensive content in compliance with FCC (Federal Communications Commission) regulations. The real-time editing may include temporarily interrupting the audio or visual portion of the broadcast to eliminate the transmission of offensive content. Conventionally, a person performs these edits manually from a remote location, e.g. at the location of live performance, and a log of the edits is manually recorded. However, when an interruption in the live performance occurs due to the edits by the person at the remote location, the broadcast network personnel are not able to determine whether the interruption in the broadcast is a result of a malfunction in transmission, or if it is a result of the content edit. Even more, manually maintained logs are susceptible to human mistakes and omissions, and are not reliable for the identification of such edits.

SUMMARY

The present disclosure is directed to systems and methods for creating and inserting event tags into media content, substantially as shown in and/or described in connection with at least one of the figures, as set forth more completely in the claims.

DETAILED DESCRIPTION

Figure 1:
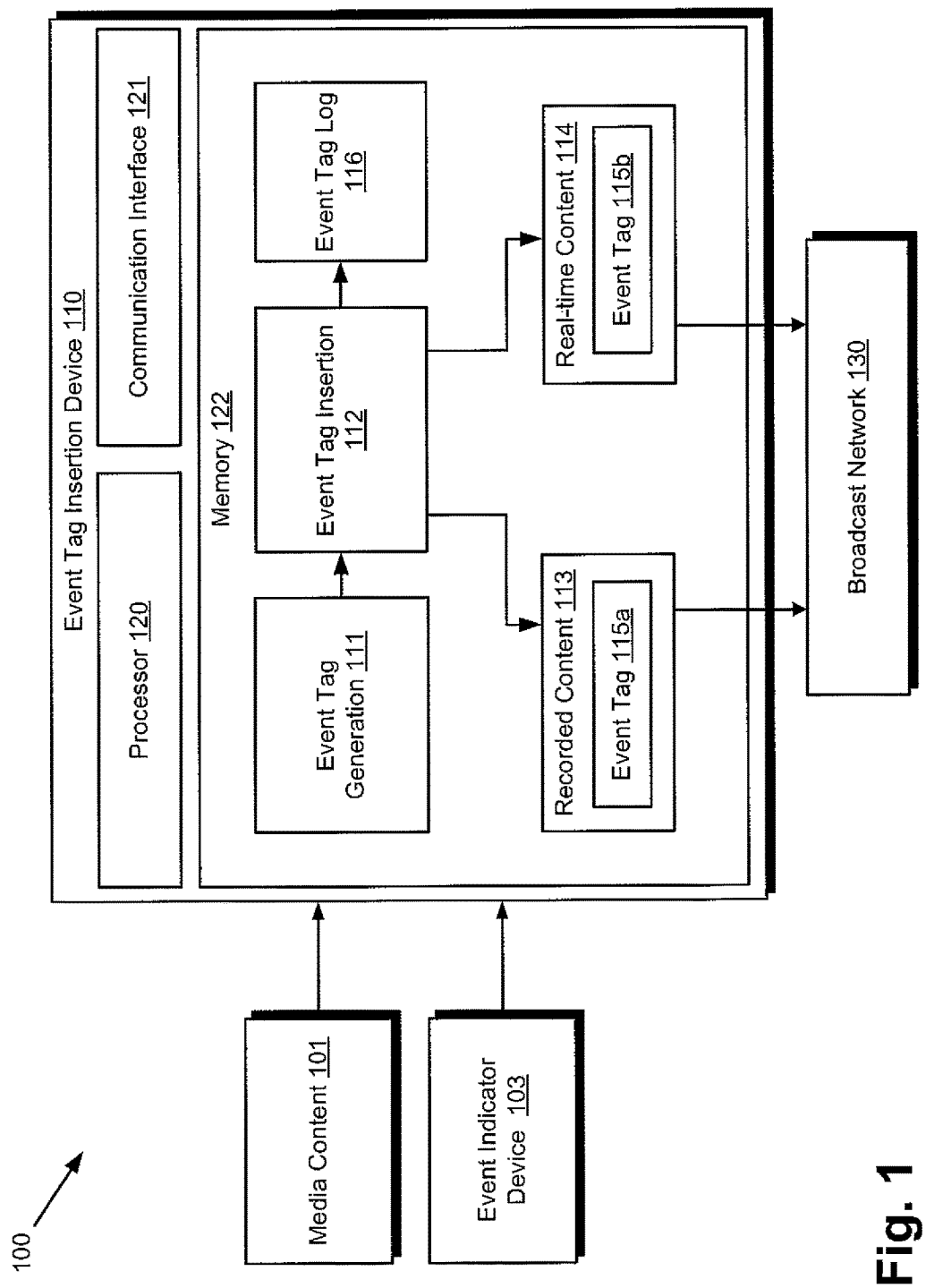
FIG. 1 illustrates an exemplary system for creating and inserting event tags into media content, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 illustrates system 100 for creating and inserting event tags into media content, according to one implementation of the present disclosure. As shown, system 100 includes event tag insertion device 110 having processor 120, communication interface 121, and memory 122. As shown, memory 122 includes modules for event tag generation 111, event tag insertion 112, and event tag log 116. Memory 122 may optionally include recorded content 113 and/or real-time content 114.

As illustrated in FIG. 1, event tag insertion device 110 may receive media content 101, and may receive input from event indicator device 103. Media content 101 may include audio content, such as audio recorded for a subsequent audio broadcast or live audio feed for a real-time audio broadcast. Media content 101 may include video content, such as video to be recorded for a subsequent video broadcast or a live feed for a real-time video broadcast. In some implementations, a live performance, such as a concert, sporting event, or speech, may be intended for real-time broadcast by broadcast company 130. When broadcast company 130 broadcasts a live performance, broadcast company 130 may implement a delay between the live performance and the real-time broadcast of the performance. The delay may be a number of seconds, such as five-ten seconds. The delay allows broadcast company 130 to make real-time edits to the live performance to avoid broadcasting potentially offensive content. In some implementations, broadcast network 130 may record media content 101 for delayed broadcast, such as a television program, a video to be posted on the Internet, or a recorded radio program. Radio broadcasts and television broadcasts may be conventional radio and television broadcasts, as well as transmissions by cable television, satellite television, satellite radio, internet television, internet radio, or other methods of transmitting media content 101 to a user device, such as a television, radio, computer, etc.

During a live performance, events that are not appropriate for public broadcast, such as a live broadcasting of a concert, may occur. As an example, during the course of a concert, a performer may use language that is not appropriate for public broadcast, or a performer may experience a wardrobe malfunction resulting in an image that is not appropriate for public broadcast. When such potentially offensive events occur, broadcast network 130 may desire to edit that portion of the performance by muting audio, removing the video, replacing the video, blurring or pixelating the video, or otherwise editing the potentially offensive event prior to public broadcasting of media content 101. Typically, a broadcast company has a representative of its Broadcast Standards and Practices (BS&P) group present to review and determine whether any audio or video content is permissible for public broadcast, e.g. not in violation of FCC regulations. When the BS&P representative determines that an element of the live performance is not appropriate for public broadcast, the BS&P representative may operate event indicator device 103 to mute the audio, remove the video, replace the video, blur or pixelate the video, or otherwise edit the potentially offensive event prior to public broadcasting of media content 101. The BS&P representative may be on-site at the live performance, at the broadcast facility of broadcast network 130, or some other location suitable for deciding whether audio or video content may be acceptable for public broadcast.

Event indicator device 103 may be any input or signal generating device for indicating the occurrence of an event in media content 101, where an event may be an element of a media content that broadcast company 130 desires to edit before broadcasting the media content. Event indicator device 103 may be a manual or an automatic input device that is operable to send a signal indicating the occurrence of an event. Event indicator device 103 may be a manually operated device that is activated by a person using a switch, a capacitive button, a resistive button, voice recognition or motion recognition. Alternatively, event indicator device 103 may be an automated device that may use image recognition technology or speech recognition technology to detect or recognize undesirable elements of media content 101 and send signals to event tag insertion device 110 to make edits to media content 101.

In one example, the BS&P representative, who is manually operating event indicator device 103, may view or hear two separate media content streams, namely the live performance and the media content that transmitted on a delay by broadcast network 130. A delay of this type may be a number of seconds, for example, the delay may be between 1 and 5 seconds, 10 seconds, 15 seconds, 30 seconds, or any amount of time appropriate for a delay. In some implementations, broadcast network 130 may record media content 101 in one time zone and broadcast media content 101 as a real-time broadcast, but delay broadcast of media content 101 in another time zone. During the initial production of media content 101, if the BS&P representative sees or hears an event that may be offensive in the live feed, the BS&P representative calls out a command to edit the event in the live feed. The BS&P representative then switches attention to the delayed feed. When the expletive, nudity, moment of violence, or other potentially offensive element of media content 101 is about to occur, the representative may operate event indicator device 103, which may suppress or mute the audio, pixelate the video, black out the entire media content feed, or otherwise edit media content 101.

In some implementations, broadcast network 130 may use event tag 115 to replace a BS&P edit with alternate content. For example, broadcast company 130 may first broadcast a concert as real-time content to the Eastern Time Zone, and the concert may later be re-broadcast as recorded content in other time zones, such as the Pacific Time Zone. In such an example, an audio BS&P edit executed during the real-time broadcast may appear as a mute in the audio for a few seconds, temporarily disrupting the broadcast. However, when media content 101 is re-broadcast, e.g., in another time zone as recorded content, broadcast network 130 may fill the edit with the music of the concert, muting only the microphone recording the offending words, or broadcast company 130 may substitute some alternative, less offensive sound. Such an updated concert may provide a less disruptive edit for the viewers of the subsequent recorded content broadcast. Similarly, when the event in media content 101 is a visual element, a subsequent broadcast may be able to substitute an alternative camera, or may provide some other content to reduce the disruption in the concert perceived by the broadcast audience.

Event tag insertion device 110 may receive media content 101. In the case that a BS&P representative of a broadcast company operates event indicator device 103, event tag insertion device 110 may receive an input corresponding to the operation of event indicator device 103 in media content 101 and resulting in the insertion of event tag 115 into media content 101. Event tag 115 may include information such as a time stamp or a frame number corresponding to media content 101. Accordingly, event tag 115 may be a timestamp accurate or a frame accurate record of the occurrence of an event in media content 101.

As illustrated in FIG. 1, event tag insertion device 110 includes processor 120 and memory 122. Processor 120 may be configured to access memory 122 to store received input or to execute commands, processes, or programs stored in memory 122, such as event tag generation 111 and event tag insertion 112. Processor 120 may correspond to a processing device, such as a microprocessor or similar hardware processing device, or a plurality of hardware devices. Memory 122 is a sufficient memory capable of storing commands, processes, and programs for execution by processor 120. Memory 122 is a non-transitory medium for storing data.

Event tag insertion device 110, using processor 120, may generate and insert event tag 115 into media content 101 using event tag generation 111 and event tag insertion 112. Event tag generation 111 may be used by event tag insertion device 110 to generate event tags for insertion into media content 101, such as event tag 115a inserted into recorded content 113 and event tag 115b inserted into real-time content 114. Event tags 115a and 115b may include information corresponding to the position of an event in media content 101. In some implementations, the position of an event in media content 101 may include a time stamp corresponding to media content 101, or a frame number corresponding to media content 101.

In some implementations, event tag 115a may include a metadata container that provides information about recorded content 113 such as, but not limited to, how recorded content 113 was created, the position of event tag 115a in media content 101, the length of an edit, or whether recorded content 113 includes an audio and/or a video file. In some implementations, event tag 115b may include a metadata container that provides information about real-time content 114, such as, but not limited to, how real-time content 114 was created, the position of event tag 115b in media content 101, the length of an edit, whether real-time content 114 includes an audio file and/or a video file. Event tag 115 may be a data container within a media file stored in a prescribed format.

Ancillary data (commonly abbreviated as ANC data), in the context of television systems, refers to a means which by non-video information (such as audio, other forms of essence, and metadata) may be embedded within the serial digital interface. Ancillary data is standardized by SMPTE as SMPTE 291M: Ancillary Data Packet and Space Formatting, which is incorporated herein by reference. Ancillary data can be located in non-picture portions of horizontal scan lines. This is known as horizontal ancillary data (HANC). Ancillary data can also be located in non-picture regions of the frame. This is known as vertical ancillary data (VANC). Data may be stored in the VANC by referencing a Data ID (DID) or a Secondary Data ID (SDID). SMPTE 291M allows an availability of DID/SDID combinations for user defined functions. SMPTE 291M is used for insertion of data into HDTV signals. There are also SMPTE standards for SDTV as well as UT-MTV formats that may be used in various implementations disclosed herein.

In the implementation of FIG. 1, event tag insertion device 110 utilizes event tag generation 111 to generate event tag 115a for recorded content 113 and event tag 115b for real-time content 114. After generating event tag 115, event tag insertion device 110 then utilizes event tag insertion 112 to insert event tag 115 into media content 101. For example, event tag insertion 112 may insert event tag 115a into recorded content 113 and event tag 115b into real-time content 114. In some implementations, event tag insertion 112 may insert event tag 115a into the header of recorded content 113, at the end of recorded content 113, or as a sidecar file to recorded content 113. For another example, and also discussed above, since real-time content 114 includes a media content or live feed, event tag insertion 112 may insert event tag 115b into the VANC space of real-time content 114.

Although event tag 115 is discussed as an individual tag, event tag insertion device 110 may generate and insert a plurality of event tags into media content 101. In addition to inserting event tags into media content 101 as metadata, event tag insertion device 110 may automatically create event tag log 116, where event tag log 116 records each event tag 115 inserted into media content 101. Event tag insertion 112 may send event tag 115*a* and event tag 115*b* to event tag log 116. In some embodiments, event tag log 116 may keep record of each event tag 115 generated by event tag generation 111 and/or each occurrence of an operation of event indicator device 103. Event tag log 116 may be a file stored in memory 122 and may update with each event tag 115 that is created. A record of event tags may be useful to broadcast network 130 during FCC compliance checks and audits.

Continuing with FIG. 1, after inserting event tag 115*a* into recorded content 113 and event tag 115*b* into real-time content 114, event tag insertion device 110 may transmit recorded content 113 and real-time content 114 to broadcast network 130 using communication interface 121. For example, communication interface 121 may utilize a wired or wireless technology for transmitting recorded content 113 and real-time content 114 to broadcast network 130. Broadcast network 130 may include a conventional television broadcast network, a radio broadcast network, a satellite broadcast network, a cable broadcast network, or a computer network such as the Internet.

In some implementations, a message may be inserted into the media content stream. That message may be either a custom DID/SDID message, as defined by SMPTE, or a standard SCTE 104 message using a custom indicator. A decoder at the broadcast network site may decipher the inserted message and display an indication of a BS&P edit. When a momentary break in an audio stream or a momentary disruption in the video stream occurs during a real-time media content transmission, operators and employees at a broadcast network may not be able to differentiate between a BS&P edit and a media transmission malfunction. Event tag 115 may be used to communicate that a BS&P edit has occurred by causing a visual notification or an audio notification at broadcast network 130. For example, when broadcast network 130 receives media content 101 including event tag 115, a light in the control room may turn on, a message may appear on a producer's monitor, a tone may play over a speaker, or an audio message may play informing the producer or other employees at broadcast network 130 that a BS&P edit occurred.

Figure 2:
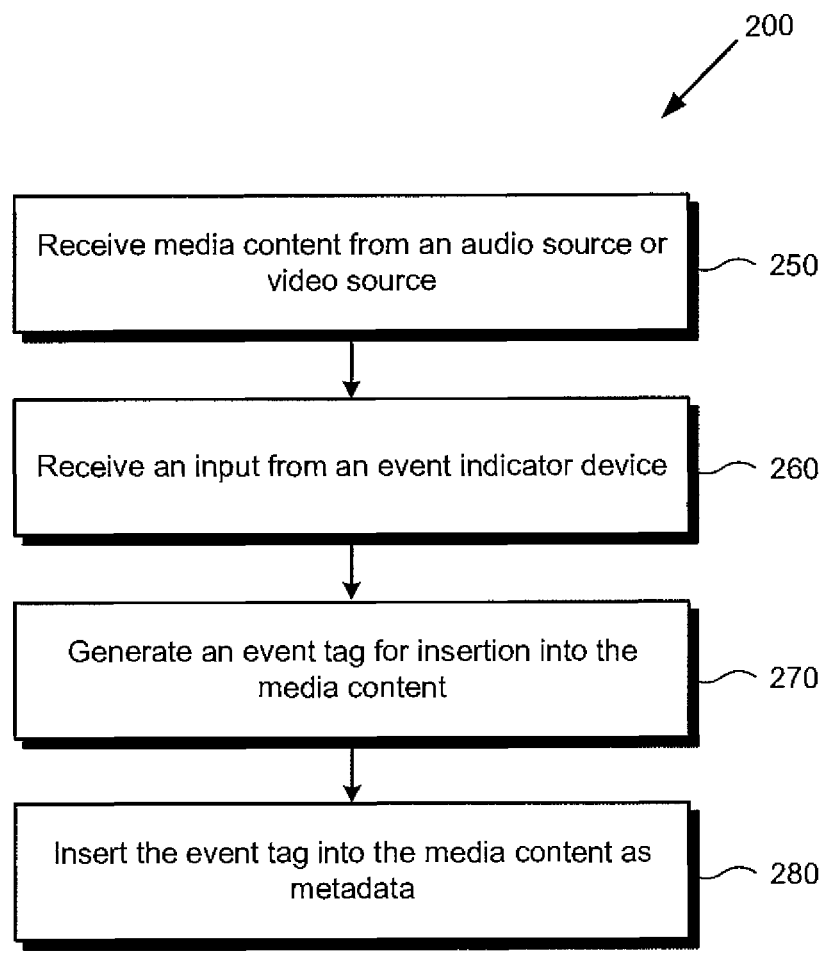
FIG. 2 presents a flowchart illustrating an exemplary method for creating and inserting event tags into media content, according to one implementation of the present disclosure.

FIG. 2 presents a flowchart illustrating a method of inserting an event tag into a media content, according to one implementation of the present disclosure. The approach and technique indicated by flowchart 200 are sufficient to describe at least one implementation of the present disclosure; however, other implementations of the disclosure may utilize approaches and techniques different from those shown in flowchart 200. Furthermore, while flowchart 200 is described with respect to FIG. 1, the disclosed inventive concepts are not intended to be limited by specific features shown and described with respect to FIG. 1.

At 250, event tag insertion device 110 may receive media content 101 from a media source. Media content may include audio content, visual content, or both audio and visual content. In some implementations, media content 101 may include a live performance, such as a concert, a speech, or a sporting event. In some implementations, media content may be a previously recorded event, such as a television program or a lecture.

At 260, event tag insertion device 110 receives an input from an event indicator device. Operation of event indicator device 103 may insert a signal indicating the occurrence of a BS&P edit. In some implementations, operation of event indicator device 103 may edit an element of media content 101, and the inserted signal may include information about that edit. Information about the edit may include a time of the edit, whether the edit was an audio edit, a video edit, or both audio and video edit. In some implementations, an edit may be a predetermined edit, for example, when event indicator device 103 is operated, an edit of fixed duration may be inserted into media content 101, such as a one-second edit, a two-second edit, a three-second edit, a four-second edit, a five-second edit, or any duration of automatic edit up to about thirty seconds. In some implementations, operation of event indicator device 103 may cause an edit matching the duration of the operation. For example, the BS&P representative may operate event indicator device 103 for eleven seconds resulting in a corresponding eleven-second edit in media content 101.

In some implementations, when the BS&P representative operates event indicator device 103, an edit corresponding to the operation of event indicator device 103 may be made in media content 101. For example, if event indicator device were operated for a duration of two seconds, a two-second edit would be inserted into media content 101. Similarly, if event indicator device 103 were operated for three seconds, for seconds, or five seconds, a three-second edit, four-second edit, or five-second edit would be respectively inserted into media content 101. Additionally, receiving an input from event indicator device 103 may include a notification that event indicator device 103 was operated. In some implementations, a notification may include an audio notification or a visual notification indicating that the BS&P representative made an edit. Broadcast network 130 may use the audio or visual notification to differentiate between an interruption caused by a transmission malfunction, and an interruption caused by a BS&P edit.

At 270, after event tag insertion device 110 receives media content 101 and input from event indicator device 103, event tag insertion module 110 generates an event tag 115 for insertion into media content. Generating event tag 115 may include an identification of the position of the event in media content 101, the type of edit (audio or video), the duration of the edit, and whether the edit was for a predetermined amount of time or an edit for the amount of time event indicator device 103 was operated. In some implementations, the position of an event in media content 101 may be indicated by a time stamp or a frame number, or a combination of time stamp or frame number of media content 101.

At 280, event tag insertion 112 inserts event tag 115 into media content as metadata. In some implementations, event tag insertion 112 inserts event tag 115 into the VANC space of media content 101. In some implementations, event tag insertion 112 inserts event tag 115 as metadata into the VANC space of media content 101. When event tag insertion 112 inserts event tag 115 into media content 101, a signal may be embedded into media content 101. The inserted signal may be a custom ID, a DID, or a SDID.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
a memory;
a processor configured to:
receive a live video of a performance including an audio portion, a video portion and an ancillary (ANC) data portion;
receive an input from an event indicator device, the input indicating an occurrence of an edit corresponding to an event in the live video, wherein the event is an offensive content impermissible for public broadcast, wherein the edit modifies the live video broadcast and includes one or more of suppressing the audio portion, pixelating the video portion, and blacking out the live video;
generate an event tag based on the edit, the event tag including the input from the event indicator device and a position of the event in the live video;
insert the event tag as metadata into the live video to generate an edited live video;
transmit the edited live video including the edit and further including the event tag to a broadcast network;
publicly broadcast, by the broadcast network, the performance using the edited live video including the edit being the one or more of suppressing the audio portion, pixelating the video portion, and blacking out the live video;
record the edited live video including the edit and further including the event tag;
replace, in response to detecting the event tag in the recorded edited live video, the edit with an alternate content to generate an edited recorded video; and
publicly re-broadcast, by the broadcast network, the performance using the edited recorded video including the alternate content.

2. The system of claim 1, wherein the position of the event in the live video is at least one of a time stamp and a frame number.

3. The system of claim 1, wherein the input from the event indicator device is for compliance with FCC rules.

4. The system of claim 1, wherein the processor is further configured to record the event tag in an event tag log in compliance with removal of the offensive content impermissible for public broadcast.

5. The system of claim 1, wherein the edit is of a fixed duration.

6. The system of claim 1, wherein the edit replaces a portion of the audio portion with another audio portion.

7. The system of claim 1, wherein the event tag is inserted as the metadata into the ancillary (ANC) portion of the live video to generate the edited live video, and wherein the event tag is inserted as the metadata into a header of or at the end of or a sidecar file of the recorded edited live video.

8. A method, for use by an event tag insertion system having a memory and a processor, of inserting an event tag in a live video, the method comprising:
receiving, using the processor, the live video of a performance including an audio portion, a video portion and an ancillary (ANC) data portion;
receiving, using the processor, an input from an event indicator device, the input indicating an occurrence of an edit corresponding to an event in the live video, wherein the event is an offensive content impermissible for public broadcast, wherein the edit modifies the live video broadcast and includes one or more of suppressing the audio portion, pixelating the video portion, and blacking out the live video;
generating, using the processor, an event tag based on the edit, the event tag including the input from the event indicator device and a position of the event in the live video;
inserting, using the processor, the event tag as metadata into the live video to generate an edited live video;
transmitting the edited live video including the edit and further including the event tag to a broadcast network;
publicly broadcasting, by the broadcast network, the performance using the edited live video including the edit being the one or more of suppressing the audio portion, pixelating the video portion, and blacking out the live video;
recording the edited live video including the edit and further including the event tag;
replacing, in response to detecting the event tag in the recorded edited live video, the edit with an alternate content to generate an edited recorded video; and
publicly re-broadcasting, by the broadcast network, the performance using the edited recorded video including the alternate content.

9. The method of claim 8, wherein the position of the event in the live video is at least one of a time stamp and a frame number.

10. The method of claim 8, wherein the input from the event indicator device is for compliance with FCC rules.

11. The method of claim 8 further comprises recording the event tag in an event tag log in compliance with removal of the offensive content impermissible for public broadcast.

12. The method of claim 8, wherein the edit is of a fixed duration.

13. The method of claim 8, wherein the edit replaces a portion of the audio portion with another audio portion.

14. The method of claim 8, wherein the event tag is inserted as the metadata into the ancillary (ANC) portion of the live video to generate the edited live video, and wherein the event tag is inserted as the metadata into a header of or at the end of or a sidecar file of the recorded edited live video.

* * * * *